United States Patent [19]

Chapman, Sr.

[11] Patent Number: 5,204,701

[45] Date of Patent: Apr. 20, 1993

[54] EYEGLASS ASSEMBLY MOUNTING A TISSUE ROLL

[76] Inventor: James R. Chapman, Sr., 67 Crest Dr., Angleton, Tex. 77515

[21] Appl. No.: 814,588

[22] Filed: Dec. 30, 1991

[51] Int. Cl.⁵ .............................................. G02C 5/14
[52] U.S. Cl. .................................... 351/121; 351/111; 351/158
[58] Field of Search .................. 351/111, 158, 130, 41, 351/119, 121

[56] References Cited

U.S. PATENT DOCUMENTS 3,647,059  3/1972  Humphreys ......................... 351/158

Primary Examiner—Bruce Y. Arnold
Assistant Examiner—Hung Xuan Dang
Attorney, Agent, or Firm—Hugh E. Smith

[57] ABSTRACT

An apparatus configured as an eyeglass assembly rotatably mounting a tissue roll to the eyeglass assembly in a spaced relationship as a comment on an individual's character and/or irreverent comments.

2 Claims, 4 Drawing Sheets

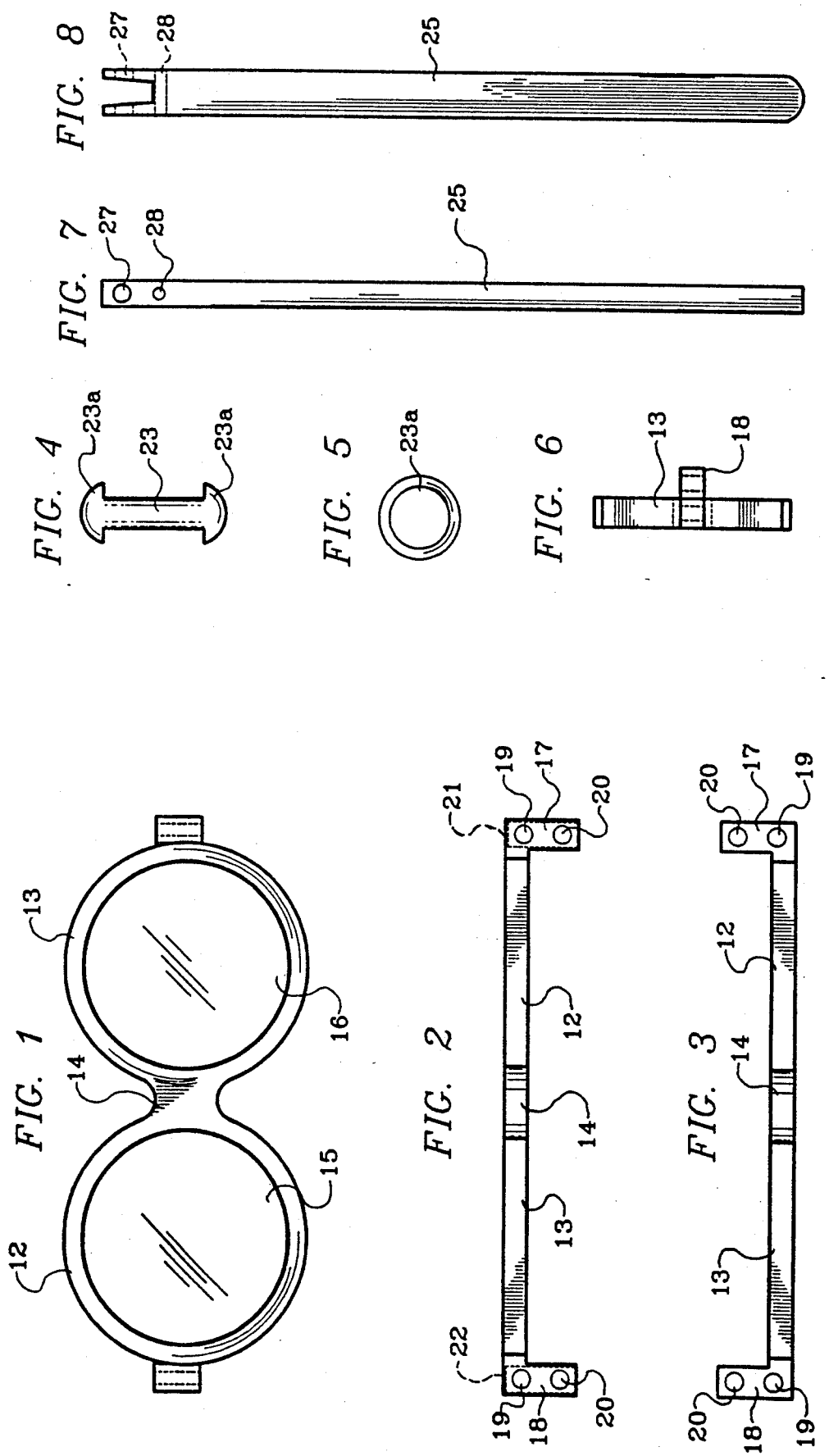

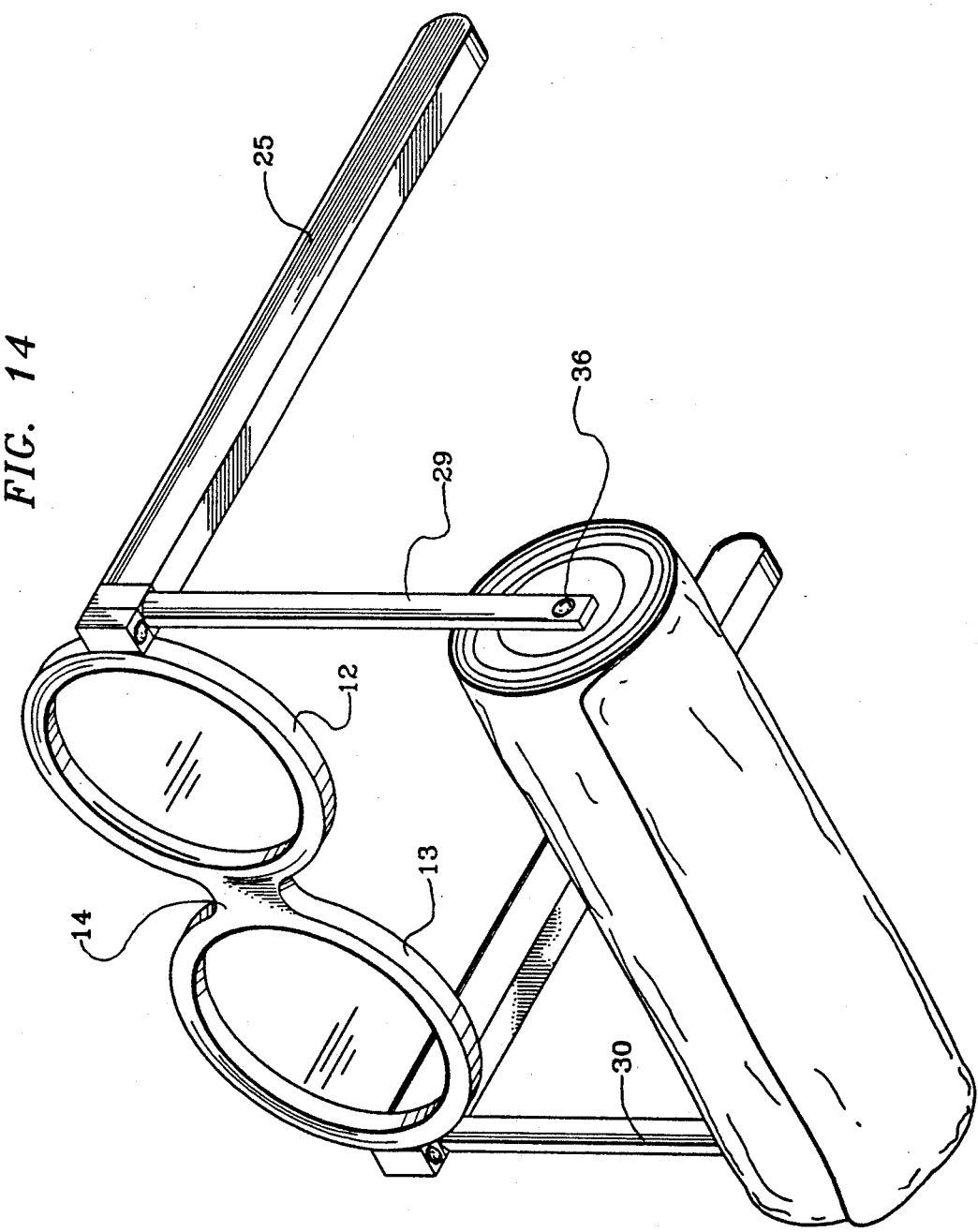

EYEGLASS ASSEMBLY MOUNTING A TISSUE ROLL

BACKGROUND OF THE INVENTION

1. Field of the invention

The field of invention relates to novelty structure, and more particularly pertains to a new and improved novelty apparatus arranged to address an individual engaged in false flattery or irreverent comments relative to other individuals to position a tissue roll dispenser associated with a lavatory environment relative to said individual.

2. Description of the Prior Art

In contemporary society there exists a category of individuals engaged in false flattery relative to others and further including individuals in attempting to curry favor engage and participate in false flattery to garner respect such as in a job environment and the like. The instant invention attempts to provide a novelty apparatus arranged to address those individuals as a comment regarding the individual's socially unacceptable approach. While prior art structure relative to eyeglass and spectacle arrangements are available in the prior art, such as exemplified in the U.S. Pat. Nos. 4,620,778; 4,045,131; 2,682,724; and 4,798,455. The prior art has yet to address a structure arranged to position relative to an individual's facial arrangement a roll of tissue positioned in a rolled web form as a comment on said individual's character and socially unacceptable behavior.

Accordingly, it may be appreciated that there continues to be a need for a new and improved novelty apparatus as set forth by the instant invention which addresses both the problems of ease of use as well as effectiveness in its incorporation in a social comment relative to an individual's behavior and in this respect, the present invention substantially fulfills this need.

SUMMARY OF THE INVENTION

In view of the foregoing disadvantages inherent in the known types of eyeglass apparatus now present in the prior art, the present invention provides a novelty apparatus wherein the same is arranged to position a tissue web in association with an eyeglass structure to effect a coordinated inter-relationship of the components to position a lavatory type tissue web as a comment on an individual3 s socially unacceptable behavior. As such, the general purpose of the present invention, which will be described subsequently in greater detail, is to provide a new and improved novelty apparatus which has all the advantages of the prior art novelty apparatus and none of the disadvantages.

To attain this, the present invention provides an apparatus configured as an eyeglass assembly mounting a tissue roll to the eyeglass assembly as a comment on an individual's character and/or irreverent comments.

My invention resides not in any one of these features per se, but rather in the particular combination of all of them herein disclosed and claimed and its is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily by utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from the cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved novelty apparatus which has all the advantages of the prior art novelty apparatus and none of the disadvantages.

It is another object of the present invention to provide a new and improved novelty apparatus which may be easily and efficiently manufactured and marketed.

It is a further object of the present invention to provide a new and improved novelty apparatus which is of a durable and reliable construction.

An even further object of the present invention is to provide a new and improved novelty apparatus which is susceptible of a low cost of manufacture with regard to both materials and labor, and which accordingly is then susceptible of low prices of sale to the consuming public, thereby making such novelty apparatus economically available to the buying public.

Still yet another object of the present invention is to provide a new and improved novelty apparatus which provides in the apparatuses and methods of the prior art some of the advantages thereof, while simultaneously overcoming some of the disadvantage normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic frontal view, taken in elevation, of the eyeglass frame.

FIG. 2 is an orthographic top view of the eyeglass frame.

FIG. 3 is an orthographic bottom view of the eyeglass frame.

FIG. 4 is an orthographic side view of a locking axle arranged to secure the temple legs relative to the eyeglass frame.

FIG. 5 is an orthographic top view of the locking axle of FIG. 4.

FIG. 6 is an orthographic side view of the eyeglass frame.

FIG. 7 is an orthographic top view of a temple leg utilized by the invention.

FIG. 8 is an orthographic side view of the temple leg, as set forth in FIG. 7.

FIG. 14 is an isometric illustration of the invention in a second orientation for use.

DESCRIPTION OF THE PREFERRED EMBODIMENT

Figure 9:
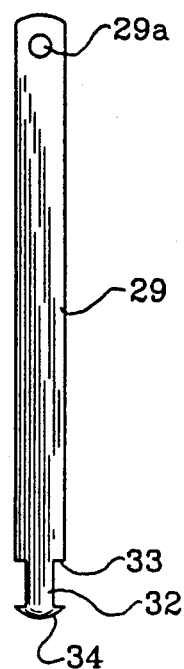
FIG. 9 is an orthographic front view of a support post utilized by the invention.
Figure 10:
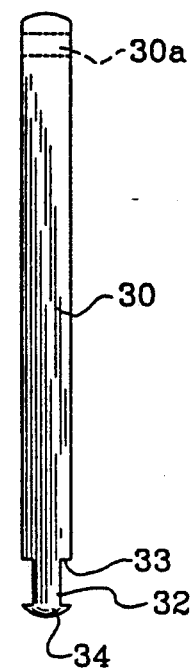
FIG. 10 is an orthographic side view of a further support post utilized by the invention.
Figure 11:
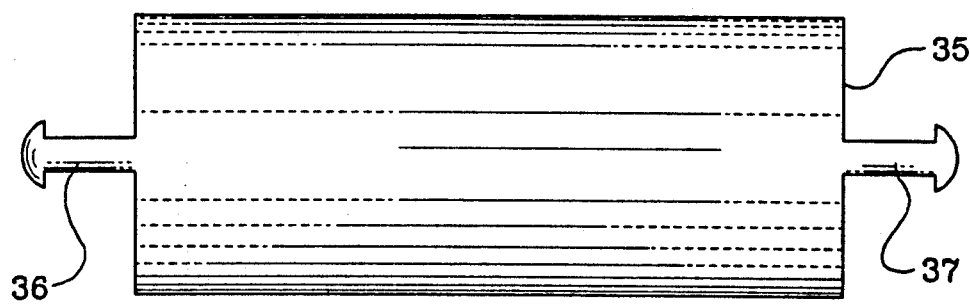
FIG. 11 is an orthographic view of a support roll utilized by the invention.
Figure 12:
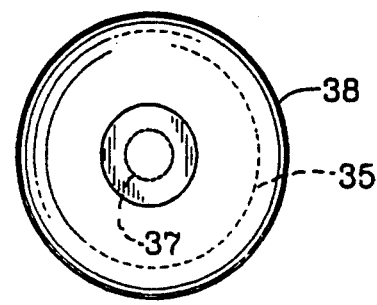
FIG. 12 is an orthographic side view of the support roll mounting a tissue web thereabout.
Figure 13:
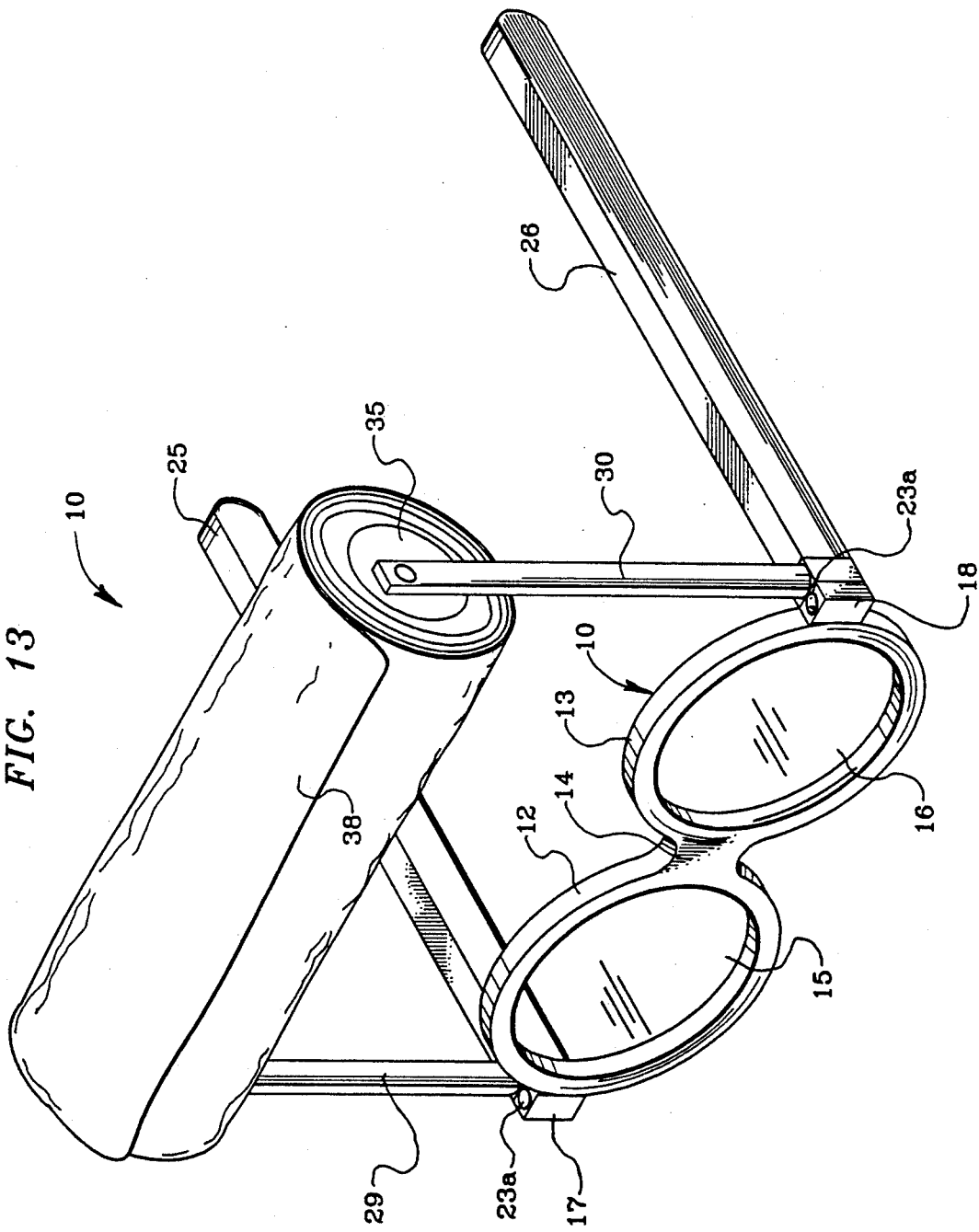
FIG. 13 is an isometric illustration of the invention in a first orientation for use.

With reference not to the drawings, and in particular to FIGS. 1 to 14 thereof, new and improved novelty apparatus embodying the principles and concepts of the present invention and generally designated by the reference numeral 10 will be described.

More specifically, the novelty apparatus 10 of the instant invention essentially comprises an eyeglass frame 11 to include a first lens support ring 12 positioned adjacent a second lens support ring 13, including a bridge web 14 securing the first and second lens support rings 12 and 13 in adjacency. A respective first and second lens 15 and 16 of a transparent or translucent construction may optionally be positioned within respective first and second rings 12 and 13. A first support ring flange 17 is mounted tangentially to the first ring 12, with a second support ring flange 18 mounted tangentially to the second support ring 13, with the first and second support ring flanges 17 and 18 positioned in an opposed orientation relative to the eyeglass frame 11. The first and second flanges 17 and 18 provide orientation of respective first and second distal ends of the eyeglass frame 11 in use. The first and second flanges 17 and 18 each includes respective first and second flange bores 19 and 20 that are parallel relative to one another, with the first and second flanges 17 and 18 including a respective first and second socket 21 and 22 directed into the first and second flanges intersecting and in communication with the first and second bores 19 and 20. A locking axle 23 including a locking axle head portion 23a at the upper and lower distal ends thereof is directed through the first flange bore 19 of each flange 17 and 18 when a respective first and second temple leg 25 and 26 of identical construction are directed into the first and second sockets 21 and 22 respectively. The first and second temple legs each include a respective first and second temple leg bore 27 and 28. The first temple leg bore 27 is coaxially aligned with the first flange bore 19 to receive an associated locking axle 23 therethrough, with the second temple leg bore 28 coaxially aligned with the second flange bore 20 to receive a lower distal end of a support post structure 29 and 30 defining a first and second support post mounted within the respective first and second flanges 17 and 18. The first support post includes a first support post bore 29a directed orthogonally adjacent an upper distal end of the first support post, with the second support post 30 including a second support post bore 30a orthogonally directed adjacent an upper distal end of the second support post. The first support post bore and the second support post bore are coaxially aligned relative to one another. A support post axle 32 is formed at a lower distal end of each support post to be directed through the respective second temple leg bore 28 and the second flange bore 20. The support post axle is oriented between a support post shoulder 33 at an upper distal end of the axle 32 and support axles head 34 mounted at a lower distal end of the axle to capture a respective flange between the shoulder and the axle head 33 and 34. A support roll 35 is rotatably mounted between the first and second support post bores 29a and 30a. The support roll includes a support roll first axle 36 directed through the first support post bore 29a, with the support roll including a support roll second axle 37 directed through the second support post bore 30a. A tissue paper web 38 is wound about the support roll 35 for positioning in an overhead orientation or relative to an individual's mouth portion when mounted to an individual to be utilized in the configurations of the FIGS. 13 and 14 respectively.

The novelty apparatus of the invention accordingly directs a social comment to that class of individuals engaged in undesirable social behavior and is directed to comment and suggested improvement in such individual's behavior in a social environment.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A novelty apparatus, comprising in combination,
an eyeglass frame, the eyeglass frame including a first lens support ring positioned adjacent a second lens support rings, wherein the first lens support ring and the second lens support ring are arranged in substantially coplanar relationship to include a bridge web securing the first lens support ring relative to the second lens support ring, the first lens support ring includes a first support ring flange, and the second lens support ring includes a second support ring flange, with the first support ring flange positioned at a first distal end of the eyeglass frame and the second support ring flange positioned adjacent a second distal end of the eyeglass frame, and the first support ring flange includes a first temple leg mounted thereto, the second support ring flange includes a second temple leg mounted thereto, and the first temple leg includes a first support post orthogonally mounted to the first support ring flange adjacent the first temple leg, and the second support ring flange includes a second support post orthogonally mounted to the second support ring flange adjacent to and orthogonally oriented relative to the second temple leg, wherein the first support post and the second support post are arranged in a parallel coextensive relationship relative to one another, with the first support post including a first support post bore, the second support post including a second support post bore, wherein the first support post bore and the second support post bore are coaxially aligned, and support roll rotatably mounted between the first support post and the second support post, with the support roll including a first axle directed through the first support post bore, and the support roll including a second axle directed through the second support post bore, and a tissue paper web wound about the support roll spaced from the eyeglass frame.

2. An apparatus as set forth in claim 1 wherein the first flange and the second flange each include a first flange bore and a second flange bore, wherein the first flange bore and the second flange bore are arranged in a parallel relationship directed through said flange, and the first flange and the second flange include a respective first socket and second socket directed into the respective first flange and the second flange, wherein the respective first socket and the second socket intersect the respective first flange bore and the second flange bore of each of said first flange and said second flange, and each first flange bore includes a locking axle directed through the first flange bore to secure the respective first temple leg and the second temple leg within a respective first flange and second flange, and the first flange second bore is mounted upon the first support post, the second flange second bore is mount upon the second support post.

* * * * *